US009611340B2

United States Patent
Denkwitz et al.

(10) Patent No.: US 9,611,340 B2
(45) Date of Patent: Apr. 4, 2017

(54) HIGH PERFORMANCE ZIEGLER-NATTA CATALYST SYSTEMS, PROCESSES FOR PRODUCING SUCH CATALYST SYSTEMS, AND USE THEREOF

(71) Applicant: Lummus Novolen Technology GmbH, Mannheim (DE)

(72) Inventors: Yvonne Denkwitz, Mannheim (DE); Oliver Schuster, Weinheim (DE); Andreas Winter, Neuleininger (DE)

(73) Assignee: Lummus Novolen Technology GmbH, Mannheim (DE)

( * ) Notice: Subject to any disclaimer, the term of this patent is extended or adjusted under 35 U.S.C. 154(b) by 0 days.

(21) Appl. No.: 14/287,489

(22) Filed: May 27, 2014

(65) Prior Publication Data

US 2014/0357815 A1 Dec. 4, 2014

Related U.S. Application Data

(60) Provisional application No. 61/869,364, filed on Aug. 23, 2013, provisional application No. 61/830,322, filed on Jun. 3, 2013.

(51) Int. Cl.
*B01J 31/00* (2006.01)
*B01J 37/00* (2006.01)
(Continued)

(52) U.S. Cl.
CPC .......... *C08F 10/06* (2013.01); *C08F 2410/04* (2013.01)

(58) Field of Classification Search
CPC ... B01J 37/00; B01J 31/00; C08F 4/02; C08F 4/60; C08F 110/06
(Continued)

(56) References Cited

U.S. PATENT DOCUMENTS 4,829,034 A 5/1989 Iiskolan et al.
4,971,937 A 11/1990 Albizzati et al.
(Continued)

FOREIGN PATENT DOCUMENTS

EP 0361494 * 4/1990 .............. C08F 4/654
JP 61023607 A * 2/1986 .............. C08F 10/06
(Continued)

OTHER PUBLICATIONS

English abstract of JP 61023607 A.*
(Continued)

*Primary Examiner* — Alexa Neckel
*Assistant Examiner* — Elizabeth Eng
(74) *Attorney, Agent, or Firm* — Osha • Liang LLP (57) ABSTRACT

A catalyst system for the polymerization of olefins may include a first solid catalytic component and a second solid catalytic component. The first solid catalytic component may include: a spherical $MgCl_2$-xROH support; a group 4-8 transition metal; and a diether internal electron donor. The second solid catalytic component may include: a spherical $MgCl_2$-xROH support; a group 4-8 transition metal; and a diether internal electron donor. The first solid catalytic component produces a propylene homopolymer having a Xylene Solubles (XS) value of greater than 2 wt %; and the second solid catalytic component produces a propylene homopolymer having a XS value of less than 2 wt %. The second catalytic component may act as an external electron donor during use, and embodiments herein do not require use of any additional external electron donors to control polymerization and reliably vary the properties of the resulting polymer.

17 Claims, 3 Drawing Sheets

(51) Int. Cl.
  *C08F 4/02*    (2006.01)
  *C08F 4/60*    (2006.01)
  *C08F 110/06*  (2006.01)
  *C08F 10/06*   (2006.01)

(58) Field of Classification Search
  USPC ...... 526/124.4, 351, 209, 212; 502/111, 126
  See application file for complete search history.

(56) References Cited

U.S. PATENT DOCUMENTS

| | | | |
|---|---|---|---|
| 5,905,050 | A | 5/1999 | Koshinen et al. |
| 6,020,279 | A | 2/2000 | Uwai et al. |
| 2004/0077490 | A1* | 4/2004 | Collina .................. C08F 10/06 502/114 |
| 2005/0107245 | A1 | 5/2005 | Morini et al. |
| 2010/0069580 | A1 | 3/2010 | Standaert et al. |
| 2010/0069586 | A1 | 3/2010 | Klendworth et al. |

FOREIGN PATENT DOCUMENTS

| | | |
|---|---|---|
| WO | 0136496 A1 | 5/2001 |
| WO | 2007147864 A2 | 12/2007 |
| WO | 2009152268 A1 | 12/2009 |

OTHER PUBLICATIONS

International Search Report and Written Opinion mailed Sep. 26, 2014 in corresponding PCT application No. PCT/EP2014/060345 (11 pages).

Li Lu et al.: "Propylene polymerization over MgC12-supported TiCl4 Catalysts"; Journal of Applied Polymer Science, vol. 124, No. 2, Apr. 15, 2012; pp. 1265-1270 (6 pages).

Nannan Cui et al.: "Effect of Diether as Internal Donor on MgCl2-Supported Ziegler-Natta Catalyst"; Journal of Applied Polymer Science, vol. 99, No. 4., Feb. 15, 2006; pp. 1399-1404 (6 pages).

Correspondence reporting an Official Letter and Search Report issued Jul. 22, 2015 in corresponding Taiwan application No. 103119236 (13 pages).

Written Opinion issued Sep. 26, 2016 in corresponding Singapore application No. 11201509854S (8 pages).

Office Action issued on Feb. 6, 2017 in corresponding Colombian Application No. 15282466; with English Communication reporting the same (15 pages).

* cited by examiner

HIGH PERFORMANCE ZIEGLER-NATTA CATALYST SYSTEMS, PROCESSES FOR PRODUCING SUCH CATALYST SYSTEMS, AND USE THEREOF

CROSS-REFERENCE TO RELATED APPLICATIONS

Pursuant to 35 U.S.C. §119(e), this application claims priority to U.S. Provisional Application 61/830,322, filed on Jun. 3, 2013; and U.S. Provisional Application 61/869,364, filed on Aug. 23, 2013, both of which are herein incorporated by reference in their entirety.

FIELD OF THE DISCLOSURE

Embodiments disclosed herein relate generally to an improved Ziegler-Natta catalyst system comprising a combination of at least two solid catalytic components with diether compounds as internal donor, where one solid catalytic component takes the role of the external donor for controlling the stereospecificity of the polymer. In other aspects, embodiments herein relate to the use of such a catalyst system for the polymerization of olefins.

BACKGROUND

Ziegler-Natta catalysts are generally composed of a catalyst support material and a transition metal component. The transition metal component is typically a substituted group 4-8 transition metal, with titanium, zirconium, chromium or vanadium being commonly used. The transition metal is often provided as a metal halide, such as $TiCl_4$. Ziegler-Natta catalysts are used to effectively promote the high yield polymerization of olefins. In the polymerization of olefins, the catalyst is often used in combination with an organo-aluminum cocatalyst.

When used to catalyze the polymerization of propylene, a third component, an electron donor, is often used in the catalyst to control the stereoregularity of the polymer. The electron donor may be incorporated into the catalyst during its synthesis (an internal donor), or it can be added to the polymerization reactor during the polymerization reaction (an external donor). In some polymerization processes, both an internal donor and an external donor may be used. Various aromatic esters, diethers, succinates, alkoxysilanes and hindered amines are examples of compounds that have been used as internal and/or external donors.

Typical external donors are alkoxysilanes, which are used to control the stereospecificity of the polymer during the polymerization process. An indicator of the isotacticity of a polymer is the xylene solubles (XS) content. In the presence of sufficient amounts of silane, every external donor features a specific XS plateau, e.g. XS of 1 wt %. Thus the XS can only be varied by depleting the system of the external donor. Unfortunately, the XS content rises steeply when decreasing the amount of silane in the polymerization and therefore adjustment on the industrial scale is a concern. For example only a slight variation in the silane concentration can cause an XS value of 10 wt % instead of 4 wt %, which can lead to a reactor shut down. Moreover, as worst case scenario a typical catalyst containing phthalate can produce polymer with XS values higher than 20 wt % in the absence of a silane.

One well known support material used in Ziegler-Natta catalysts is $MgCl_2$. The $MgCl_2$ material may be complexed with ethanol (EtOH). In preparing the catalyst, most or all of the EtOH reacts with the transition metal halide, such as $TiCl_4$.

For example, U.S. Pat. No. 4,829,034 to Iiskolan describes a Ziegler-Natta catalyst, and a method for making the catalyst, using a $MgCl_2$-xEtOH support in which x is about 3. In Iiskolan, the support material is first contacted with an internal donor, such as D-i-BP (di-isobutyl-phthalate). The support-D-i-BP complex is then combined with $TiCl_4$ to form the catalyst.

U.S. Pat. No. 6,020,279 to Uwai describes a method for making a Ziegler-Natta catalyst by producing a $MgCl_2$-xEtOH support in which x=1.5 to 2.1 and the support has an average particle diameter of 91 µm. The support is combined with a titanium halide, such as $TiCl_4$, and an internal electron donor for 10 minutes to 10 hours at 120° C. to 135° C. in the presence of an aliphatic solvent. As internal donors, esters like di-isobutyl-phthalate (Examples) are preferred.

Due to health, environment and safety concerns in connection with the use of phthalate-containing Ziegler-Natta catalysts for the production of polymers with potential skin or food contact, a second driver to develop new Ziegler-Natta catalysts is the need to provide non-phthalate catalyst versions that produce polymers with an identical or at least very similar performance profile as the currently broadly used phthalate-containing Ziegler-Natta catalysts.

Well known alternatives to Ziegler-Natta catalysts based on phthalates as internal donors are versions where various malonates, succinates or diether compounds are used. Unfortunately, the use of such alternative internal donors results in polymers with fully different performance profiles. As an example and a direct comparison, the use of a phthalate based Ziegler-Natta catalyst leads to polymers with a GPC Polydispersity Index (PI) (also referred to as Molecular Weight Distribution or Mw/Mn) in the range of 6.5 to 8, when using certain diethers as an internal donor the polydispersity is much more narrow (4.5 to 5.5), and when using succinate as internal donor the polydispersity is 10 to 15 (Polypropylene Handbook, $2^{nd}$ Edition, Editor: Nello Pasquini, Carl Hanser Verlag, Munich, 2005, page 18, Table 2.1 and P. Galli, G. Vecellio, Journal of Polymer Science: Part A: Polymer Chemistry, Vol. 42, 396-415 (2004), pages 404-405 and Table 1).

The molecular weight distribution is one of the most important properties of a polymer. By changing this parameter, the crystalline structure and the crystallization rate of a polymer is dramatically influenced, which has impact on the convertability and usability of a polymer for a given application. As an example, for extrusion applications like sheet, pipe, film, raffia, or thermoforming, a broader molecular weight distribution is advantageous, while for applications like fiber or injection molding a narrower molecular weight distribution would be advantageous. As being accustomed to processing polymers produced with phthalate based Ziegler-Natta catalysts, the converters insist in molecular weight distributions typically produced by such catalysts and expect that phthalate free Ziegler-Natta catalysts deliver a similar molecular weight distribution. Unfortunately, state of the art diether based catalysts deliver polymers where the molecular weight distribution is too narrow while succinate based catalysts deliver polymers where the molecular weight distribution is far too broad.

The xylene solubles (XS) content is another very important property of a polymer, and is an indicator for the stereospecificity of a polymer. By changing this parameter, the crystalline structure and the crystallization rate of a polymer is dramatically influenced as well, which has impact on the usability of a certain polymer for a given application, as stiffness and toughness of polymer resins as well as their behavior during processing, are widely dominated by the content of xylene solubles (XS).

As external donors, alkoxysilanes are broadly used. These compounds regulate the stereospecificity of the polymer and thus the amount of the xylene soluble content (XS) generated in the polymerization. The range of such xylene soluble contents (XS) is typically between about 1 and 6 wt % and depends on the designated application field for the polymer. As an example, in the case of polymers used in the field of film applications, such as biaxially oriented films (BOPP), the XS should be high (3 wt % up to 6 wt %). In the case of certain injection molding applications, the XS content of homo polymer resins or of the homo polymer part of heterophasic impact co-polymers should be as low as possible, preferably lower than 1.5 wt %, most preferably 1 wt % or even lower. Other important grades require XS values between 2 wt % and 3 wt %, such as for use in applications like fiber, raffia, thermoforming and thin wall injection molding. As accustomed to processing polymers which are produced with phthalate based Ziegler-Natta catalysts, the converters insist in xylene soluble contents typically produced by such catalysts and expect that phthalate free Ziegler-Natta catalysts deliver a similar xylene solubles range.

Unfortunately, state of the art diether based catalysts deliver polymers where the xylene solubles content is high, and when external donors like silanes are used to reduce the amount of xylene solubles, the technically possible reduction is low, and as a side effect the catalyst productivity drops dramatically. As a typical example a diether catalyst without addition of an external donor produces a polymer with a xylene soluble content of 4 wt %. Using the same diether catalyst together with an external donor, the xylene soluble content in the polymer can be reduced to about 2 wt %, but at the same time the catalyst productivity is reduced from 30 kg polymer/g catalyst to 15 kg polymer/g catalyst. Xylene solubles of less than 2 wt % and above 4 wt % are out of reach and accordingly, such catalysts can be used for special applications only, but cannot be used as universal catalysts covering the whole xylene soluble range typical of the numerous grades manufactured by a polymer producer. As a consequence, today diether catalysts are niche catalysts and are used for the production of specialty polymers like fiber grades where the combination of a narrow molecular weight distribution in combination with a fixed amount of xylene solubles of about 2.5 wt % is of certain value.

SUMMARY OF THE DISCLOSURE

Embodiments disclosed herein provide non-phthalate Ziegler-Natta catalyst systems comprising a combination of at least two solid catalytic components with diether compounds as internal donor for the polymerization and copolymerization of olefins that overcome the above shortcomings and provide Ziegler-Natta catalyst systems with a unique method of selecting at least two solid catalytic components with diether compounds as internal donor where the three essential components of a Ziegler-Natta catalyst, the support, the transition metal component, and the internal donor, are combined as described below. The resulting Ziegler-Natta catalyst systems have unusually high activity, excellent hydrogen response and stereoselectivity, while the molecular weight distribution is comparable to phthalate containing Ziegler-Natta catalysts and the xylene solubles content of the polymer can be adjusted between 0.5 wt % and 10 wt %.

In some embodiments, the catalyst system useful for the polymerization of olefin polymers may include a first solid catalytic component and a second solid catalytic component. The first solid catalytic component may include: a $MgCl_2$-xROH support, where x is in the range from about 1 to about 10 and wherein ROH is an alcohol or a mixture of at least two different alcohols; a group 4-8 transition metal; and a diether internal electron donor. The second solid catalytic component may include: a spherical $MgCl_2$-xROH support, where x is in the range from about 1 to about 10 and wherein ROH is an alcohol or a mixture of at least two different alcohols; a group 4-8 transition metal; and a diether internal electron donor. The first solid catalytic component produces a propylene homopolymer having a Xylene Solubles (XS) value of greater than 2 wt %; and the second solid catalytic component produces a propylene homopolymer having a XS value of less than 2 wt %.

The solid catalytic components may be formed according to embodiments herein using a $MgCl_2$-xROH support, where R is a linear, cyclic or branched hydrocarbon unit with 1-10 carbon atoms and where ROH is an alcohol or a mixture of at least two different alcohols; and where x has a range of about 1.5 to about 6.0. In some embodiments, ROH is ethanol or a mixture of ethanol and a higher alcohol with R being a linear, cyclic or branched hydrocarbon unit with 3-10 carbon atoms, such as 4-10 carbon atoms, In some embodiments, x is in the range from about 2.0 to about 4.0, such as from about 2.5 to about 3.5 or from about 2.95 to about 3.35.

The catalytic components include a group 4-8 transition metal. In some embodiments, the group 4-8 transition metal may be a substituted group 4-8 transition metal, such as titanium, zirconium, chromium or vanadium. A diether compound may be used as an internal donor.

The Ziegler-Natta catalyst systems comprising a combination of at least two solid catalytic components with diether compounds as internal donor according to embodiments described herein may have an improved activity performance in olefin polymerization reactions, as well as good stereoregularity and hydrogen sensitivity, while the molecular weight distribution is comparable to phthalate containing Ziegler-Natta catalysts and the xylene solubles content of the polymer can be adjusted between 0.5 and 10 wt %.

Embodiments herein are also directed to methods of making the improved Ziegler-Natta catalyst systems comprising a combination of at least two solid catalytic components with diether compounds as internal donor. Generally, an $MgCl_2$-xROH is treated with a transition metal halide, such as $TiCl_4$, at a low temperature (−10° C. to +10° C.). The reaction product is heated to approximately 80° C. and contacted with the diether compound. The resulting precatalyst is heated to about 105° C. and held at that temperature for a period of time, preferably about 1 to 3 hours. The reaction mixture is filtered and washed with an organic solvent. Then the solid catalyst is preferably extracted with an organic solvent/$TiCl_4$ mixture at elevated temperature. The catalyst is washed with a solvent, such as heptane, and vacuum dried.

The improved catalyst systems described herein can be used to produce polypropylene or other polymerized olefins. The catalyst system comprising a combination of at least two solid catalytic components with diether compounds as internal donor, where one catalyst takes the role of the external donor for controlling the stereospecificity of the polymer. Thus, there is no need for silanes to control the stereospecificity of the polymer. The catalyst system comprises (i) a solid catalytic component containing diether or a mixture of at least two solid catalytic components containing diether producing homo polymers with XS values >2 wt % and (ii) a solid catalytic component containing diether producing homo polymer with a XS value <2 wt %, which takes the role of the external donor. Adjustment of the XS values is done by variation of the solid catalytic component (ii) which can be varied between 0.01 wt % and 99.99 wt % relative to catalytic component (i). The catalyst systems described herein exhibit an improved activity performance and hydrogen response, while producing polymers having good stereospecificity and morphology, and an improved control of the stereospecificity, where the xylene solubles content of the polymer can be adjusted between 0.5 and 10 wt %.

Other aspects and advantages will be apparent from the following description and the appended claims.

DETAILED DESCRIPTION

In one aspect, embodiments disclosed herein relate to Ziegler-Natta catalyst systems including a combination of at least two solid catalytic components with diether compounds as internal donor useful for the polymerization of olefins, where one solid catalytic component takes the role of the liquid external donor, e.g. alkoxysilane for controlling the stereospecificity of the polymer. The solid catalytic components with diether compounds as internal donor provided herein are formed using a $MgCl_2$-xROH support, where R is a linear, cyclic or branched hydrocarbon unit with 1-10 carbon atoms like methyl, ethyl, propyl, butyl, pentyl, cyclopentyl, hexyl, cyclohexyl, heptyl or octyl and where ROH is an alcohol or a mixture of at least two different alcohols, preferably where the ROH is ethanol or a mixture of ethanol and a higher alcohol with R being a linear, cyclic or branched hydrocarbon unit with 3-10 carbon atoms like propyl, butyl, pentyl, cyclopentyl, hexyl, cyclohexyl, heptyl or octyl, preferably 4-10 carbon atoms like butyl, pentyl, cyclopentyl, hexyl, cyclohexyl, heptyl or octyl; and where x has a range of about 1.5 to 6.0, preferably about 2.0 to 4.0, more preferably about 2.5 to 3.5 and even more preferably 2.95 to 3.35. If ROH is a mixture of ethanol and a higher alcohol, the molar ratio of ethanol:higher alcohol is at least 80:20, preferably 90:10, most preferably 95:5.

In some embodiments, the support material may be a "spherical $MgCl_2$ support." The spherical $MgCl_2$ support may have any desired particle size. In some embodiments, the spherical $MgCl_2$ support has an average particle size ($d_{50}$) of between about 10 microns to about 200 microns, preferably 20 microns and 150 microns, and more preferably between 30 microns to 120 microns, and even more preferably between 40 microns to 90 microns. The spherical $MgCl_2$ support may be produced according to U.S. Pat. No. 4,829,034 to Iiskolan and Koskinen or U.S. Pat. No. 5,905,050 to Koskinen and Louhelainen by spray-cooling of a molten $MgCl_2$-alcohol adduct.

The solid catalytic components with diether compounds as internal donor described herein include a group 4-8 transition metal, preferably a group 4-6 transition metal. In some embodiments, the Group 4-8 transition metal may be at least one of titanium, zirconium, hafnium, tantalum, niobium, rhenium, vanadium, chromium, molybdenum, tungsten, manganese, iron, ruthenium, and osmium. In preferred embodiments, the catalyst incorporates Ti, Zr, V or Cr, and most preferably Ti. The transition metal is typically provided in a halogenated form, such as a chloride, bromide or iodide. Titanium chloride is particularly preferred.

The solid catalytic components with diether compounds as internal donor may be made by contacting the spherical $MgCl_2$ support with the transition metal component in a reactor at a low temperature, preferably +10° C. or less, with stirring. The reactor may be charged with the spherical $MgCl_2$ support and the transition metal component in either order, i.e. the spherical $MgCl_2$ support may be added first and then the transition metal component may be added, or vice versa but the addition of the spherical $MgCl_2$ support to the transition metal component is preferred. The transition metal component can be diluted with an aliphatic or aromatic organic solvent, preferably an aliphatic hydrocarbon, most preferably a linear aliphatic hydrocarbon like heptane or a mixture of branched hydrocarbons like ISOPAR-H. The spherical $MgCl_2$ support is added to the reactor over a period of time, preferably between about 4 minutes to about 300 minutes. The molar ratio of the Mg of the spherical $MgCl_2$ support to the transition metal is between 1:100 and 1:5, preferably between 1:50 and 1:5, and most preferably between 1:25 and 1:5.

The reaction product of the spherical $MgCl_2$ support and the transition metal component is slowly heated to a predetermined temperature of between about 30° C. and 100° C. In a preferred embodiment, the reactor is heated to a temperature of between about 40° C. and 90° C. over a period of about 2 hours. A diether compound as internal donor is added to the reactor when it reaches the predetermined temperature. This precatalyst is then further heated to a temperature of at least 80° C., preferably between 100° C. and 125° C., more preferably between 100° C. and 110° C. and held at that temperature for a predetermined period of time, preferably between about 10 minutes and three hours. The resulting mixture is then filtered, in some embodiments while still hot, to isolate the solid component. The solid component is washed with an organic solvent and then treated at elevated temperatures using a mixture of an organic solvent and the transition metal component or using the neat transition metal component. It is preferred to apply the Soxhlet extraction method and to use a mixture of an organic solvent and the transition metal component. The organic solvent can be an aliphatic or aromatic hydrocarbon, preferably an aromatic hydrocarbon and most preferably ethylbenzene which has the same boiling point of 136° C. than $TiCl_4$ which provides a constant ratio between $TiCl_4$ and the organic solvent in the gas phase and in the extraction zone.

In one embodiment, the procedure to make the solid catalytic components with diether compounds as internal donor may include:

a) Reacting the $MgCl_2$-xROH with neat $TiCl_4$ at −30° C. to +40° C., more preferably at −20° C. to +20° C., even more preferably between −10° C. and +10° C. by slow addition of the $TiCl_4$ to the $MgCl_2$-xROH/organic solvent suspension while providing constant stirring.

b) Increasing the temperature of the above reaction mixture to between about 30° C. and 100° C., preferably between about 40 and 90° C., followed by addition of a diether donor compound and continuing to heat the mixture to at least 80° C. for about 1 to 3 hours.

c) Filtering the reaction mixture while still hot to obtain the solid precatalyst.

d) Extracting the precatalyst using the Soxhlet extraction method employing TiCl$_4$ and ethylbenzene (at a volume ratio of about 30:70, preferably 20:80, most preferably 10:90) for 1-5 hours, preferably 1-4 hours, most preferably 1-3 hours at a temperature of at least 100° C., preferably 100-135° C. most preferably 120-130° C.

e) Filtering and washing one or more times with a hydrocarbon like pentane, hexane or heptane, and then drying under vacuum and/or elevated temperature of 30-100° C., preferably 40-90° C., most preferably 50-80° C.

In a second embodiment, the method may include:

a) Preparing a cooled portion of neat TiCl$_4$ or of TiCl$_4$ diluted with a non-aromatic hydrocarbon.

b) Reacting the neat or diluted TiCl$_4$ at −30° C. to +40° C., more preferably at −20° C. to +20° C., most preferably between −10° C. and +10° C. by slow addition of the preformed, spherical particles of MgCl$_2$-xROH while providing constant stirring.

c) Increasing the temperature of the reaction mixture to about 30 to 100° C., preferably to about 40 to 90° C., followed by addition of a diether compound as internal electron donor compound and continuing to heat the mixture to at least 80° C. for about 1 to 3 hours.

d) Filtering the reaction mixture while still hot to obtain the solid precatalyst.

e) Extracting the precatalyst using the Soxhlet extraction method employing TiCl$_4$ and ethylbenzene (at a volume ratio of about 30:70, preferably 20:80, most preferably 10:90) for 1-5 hours, preferably 1-4 hours, most preferably 1-3 hours at a temperature of at least 100° C., preferably 100-135° C. most preferably 120-130° C.

f) Filtering and washing one or more times with a hydrocarbon, like pentane, hexane or heptane, and then drying under vacuum and/or elevated temperature of 30-100° C., preferably 40-90° C., most preferably 50-80° C.

Figure 1:
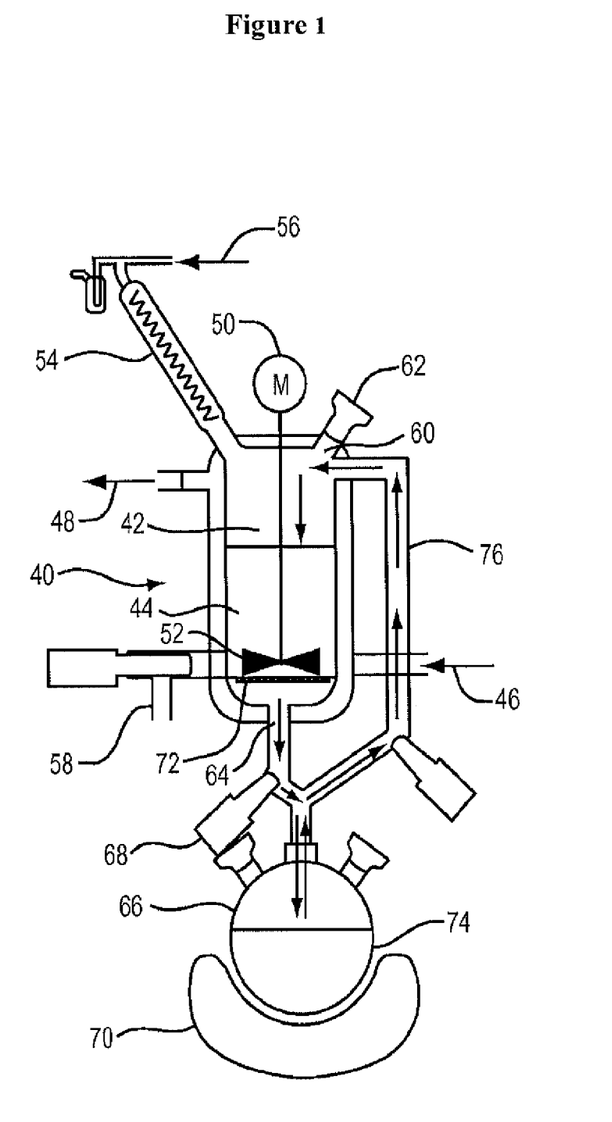
FIG. 1 is a diagram of an apparatus useful for extracting the activated catalyst according to embodiments herein from the pre-catalyst preparation.

The Soxhlet extraction method is generally well known in the art. For example, as shown in FIG. 1, the precatalyst may be placed on a porous glass frit 72 and loaded into the main chamber of the Soxhlet extractor 40. The Soxhlet extractor 40 is placed onto a flask 66 containing the extraction solvent 74, such as a mixture of TiCl$_4$ and ethylbenzene. The Soxhlet is then equipped with a condenser 54. The solvent is heated via heater 70 to reflux. The solvent vapor travels up a distillation arm 76, and floods into the chamber 42 housing the frit 72 containing the solid precatalyst. The condenser 54 ensures that any solvent vapor cools, and drips back down into the glass jacketed chamber 42 housing the solid material, which may be maintained at a temperature in the range from about 100° C. to 135° C., most preferably 120 to 130° C. The chamber containing the precatalyst slowly fills with warm solvent 44. Any contaminants in the precatalyst will then dissolve in the warm solvent and drip back down to the heating chamber 66, leaving behind the catalyst. Other less preferred methods to extract the contaminants from the pre-catalyst include, but are not limited to washing steps with a mixture of an organic solvent and TiCl$_4$ at a temperature of at least 100° C., preferably 100-135° C., most preferably 120-130° C. The organic solvent can be an aliphatic or aromatic hydrocarbon, preferably an aromatic hydrocarbon and most preferably ethylbenzene. While this specification only refers to the Soxhlet extraction method, embodiments herein contemplate use of any extraction method that uses an organic solvent and a transition metal component in solution. As an example, for production of catalyst on a commercial scale, an agitated Nutsche Filter Dryer is recommended where the extraction followed by washing steps and the drying step can be applied in only one multipurpose unit without the need to transfer the crude solid to additional vessels.

In a third embodiment, the method may include:

a) Preparing a cooled portion of neat TiCl4 or of TiCl4 diluted with a non-aromatic hydrocarbon.

b) Reacting the neat or diluted TiCl4 at −30° C. to +40° C., more preferably at −20° C. to +20° C., most preferably between −10° C. and +10° C. by slow addition of the preformed, spherical particles of MgCl2-xROH while providing constant stirring.

c) Increasing the temperature of the reaction mixture to about 30 to 100° C., preferably to about 40 to 90° C., followed by addition of a diether compound as internal electron donor compound and continuing to heat the mixture to at least 80° C. for about 1 to 3 hours.

d) Filtering the reaction mixture while still hot to obtain the solid precatalyst.

e) Reacting the precatalyst at least one time employing TiCl4 and ethylbenzene (at a volume ratio of about 30:70, preferably 20:80, most preferably 10:90) for 1-5 hours, preferably 1-4 hours, most preferably 1-3 hours at a temperature of at least 100° C., preferably 100-135° C. most preferably 120-130° C.

f) Filtering and washing one or more times with a hydrocarbon, like pentane, hexane or heptane, and then drying under vacuum and/or elevated temperature of 30-100° C., preferably 40-90° C., most preferably 50-80° C.

In a forth embodiment, the method may include:

a) Preparing a cooled portion of neat TiCl4 or of TiCl4 diluted with a non-aromatic hydrocarbon.

b) Reacting the neat or diluted TiCl4 at −30° C. to +40° C., more preferably at −20° C. to +20° C., most preferably between −10° C. and +10° C. by slow addition of the preformed, spherical particles of MgCl2-xROH while providing constant stirring.

c) Increasing the temperature of the reaction mixture to about 30 to 100° C., preferably to about 40 to 90° C., followed by addition of a diether compound as internal electron donor compound and continuing to heat the mixture to at least 80° C. for about 1 to 3 hours.

d) Filtering the reaction mixture while still hot to obtain the solid precatalyst.

e) Reacting the precatalyst at least one time employing neat TiCl4 for 1-5 hours, preferably 1-4 hours, most preferably 1-3 hours at a temperature of at least 100° C., preferably 100-135° C. most preferably 120-130° C.

f) Filtering and washing one or more times with a hydrocarbon, like pentane, hexane or heptane, and then drying under vacuum and/or elevated temperature of 30-100° C., preferably 40-90° C., most preferably 50-80° C.

Suitable diether internal donor compounds useful in embodiments herein may be represented by the general structure (I):

$$R^1O-(CR^5R^6)_n-CR^3R^4-(CR^7R^8)_m-OR^2 \quad (I)$$

wherein $R^1$ and $R^2$ are the same or different and are selected from the group consisting of a saturated or unsaturated aliphatic group of from 1 to about 20 carbon atoms or an aryl group of from 6 to about 20 carbon atoms, n+m=2 to 4, $R^3$, $R^4$, $R^5$, $R^6$, $R^7$ and $R^8$ are identical or different and are each a hydrogen atom, a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms and may contain one or more hetero atoms like Si, B, Al, O, S, N or P, and/or may contain halogen atoms like F, Cl or Br, and/or the two radicals $R^3$ and $R^4$ may form a hydrocarbon ring system. $R^3$ and/or $R^4$ are different from hydrogen.

Preferred diether internal donor compounds useful in embodiments herein may be 1,3-diether compounds represented by the structure (II):

$$R^1O—CH_2—CR^3R^4—CH_2—OR^2 \quad (II)$$

where $R^1$ and $R^2$ are the same or different and are selected from the group consisting of a saturated or unsaturated aliphatic group of from 1 to about 20 carbon atoms, more preferably an alkyl group of from 1 to about 10 carbon atoms, even more preferably an alkyl group of from 1 to 4 carbon atoms, ideally a methyl or ethyl group, most ideally a methyl group, $R^3$ and $R^4$ are identical or different and are each a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms and may contain one or more hetero atoms like Si, B, Al, O, S, N or P, and/or may contain halogen atoms like F, Cl or Br, and/or the two radicals $R^3$ and $R^4$ may form a hydrocarbon ring system.

More preferably, diether internal donor compounds useful in embodiments herein may be 1,3-diether compounds represented by the structure $$R^1O—CH_2—CR^3R^4—CH_2—OR^2 \quad (III)$$

wherein $R^1$ and $R^2$ are identical and are selected from the group consisting of an alkyl group of from 1 to about 10 carbon atoms, even more preferably an alkyl group of from 1 to 4 carbon atoms, ideally a methyl or ethyl group, most ideally a methyl group, $R^3$ and $R^4$ are identical or different and are each a linear, cyclic or branched hydrocarbon group, for example an alkyl group of from 1 to about 10 carbon atoms, an alkenyl group of from 2 to about 10 carbon atoms, an aryl group of from 6 to about 10 carbon atoms, an arylalkyl group of from 7 to about 40 carbon atoms, an alkylaryl group of from 7 to about 40 carbon atoms or an arylalkenyl group of from 8 to about 40 carbon atoms, and/or the two radicals $R^3$ and $R^4$ may form a hydrocarbon ring system, which may contain one or more hetero atoms like Si, O, S, N or P.

Examples of preferred diether electron donor compounds include: 2,2 di-cyclopentyl-1,3-dimethoxypropane; 2,2 di-(cyclopentylmethyl)-1,3-dimethoxypropane; 2,2-di-cylohexyl-1,3-dimethoxypropane; 2,2-di-(cylohexylmethyl)-1,3-dimethoxypropane; 2,2-di-norbornyl-1,3-dimethoxypropane; 2,2-di-phenyl-1,3-dimethoxypropane; 2,2-di-phenylmethyl-1,3-dimethoxypropane; 2,2-di-n-propyl-1,3-dimethoxypropane; 2,2-di-isopropyl-1,3-dimethoxypropane; 2,2-di-n-butyl-1,3-dimethoxypropane; 2,2-di-secbutyl-1,3-dimethoxypropane; 2,2-di-isobutyl-1,3-dimethoxypropane; 2,2-di-n-pentyl-1,3-dimethoxypropane; 2,2-di-(2-pentyl)-1,3-dimethoxypropane; 2,2-di-(3-pentyl)-1,3-dimethoxypropane; 2,2-di-(methylbutyl)-1,3-dimethoxypropane; 2,2-di-(3-methylbut-2-yl)-1,3-dimethoxypropane; 2,2-di-isopentyl-1,3-dimethoxypropane; 2,2-di-n-hexyl-1,3-dimethoxypropane; 2,2-di-2-hexyl-1,3-dimethoxypropane; 2,2-di-3-hexyl-1,3-dimethoxypropane; 2,2-di-(2-methylpentyl)-1,3-dimethoxypropane; 2,2-di-(3-methylpentyl)-1,3-dimethoxypropane; 2,2-di-(4-methylpentyl)-1,3-dimethoxypropane; 2-tertbutyl-1,3-dimethoxypropane; 2-ethyl-2-tertbutyl-1,3-dimethoxypropane; 2-n-propyl-2-tertbutyl-1,3-dimethoxypropane; 2-n-butyl-2-tertbutyl-1,3-dimethoxypropane; 2-isobutyl-2-tertbutyl-1,3-dimethoxypropane; 2-n-pentyl-2-tertbutyl-1,3-dimethoxypropane; 2-isopentyl-2-tertbutyl-1,3-dimethoxypropane; 2-n-hexyl-2-tertbutyl-1,3-dimethoxypropane; 2-ethyl-2-isopropyl-1,3-dimethoxypropane; 2-n-propyl-2-isopropyl-1,3-dimethoxypropane; 2-n-butyl-2-isopropyl-1,3-dimethoxypropane; 2-secbutyl-2-isopropyl-1,3-dimethoxypropane; 2-isobutyl-2-isopropyl-1,3-dimethoxypropane; 2-n-pentyl-2-isopropyl-1,3-dimethoxypropane; 2-(2-pentyl)-2-isopropyl-1,3-dimethoxypropane; 2-(3-pentyl)-2-isopropyl-1,3-dimethoxypropane; 2-methylbutyl-2-isopropyl-1,3-dimethoxypropane; 2-(3-methylbut-2-yl)-2-isopropyl-1,3-dimethoxypropane; 2-isopentyl-2-isopropyl-1,3-dimethoxypropane; 2-n-hexyl-2-isopropyl-1,3-dimethoxypropane; 2-(2-hexyl)-2-isopropyl-1,3-dimethoxypropane; 2-(3-hexyl)-2-isopropyl-1,3-dimethoxypropane; 2-(2-methylpentyl)-2-isopropyl-1,3-dimethoxypropane; 2-(3-methylpentyl)-2-isopropyl-1,3-dimethoxypropane; 2-(4-methylpentyl)-2-isopropyl-1,3-dimethoxypropane; 2-ethyl-2-cyclopentyl-1,3-dimethoxypropane; 2-n-propyl-2-cyclopentyl-1,3-dimethoxypropane; 2-isopropyl-2-cyclopentyl-1,3-dimethoxypropane; 2-n-butyl-2-cyclopentyl-1,3-dimethoxypropane; 2-isobutyl-2-cyclopentyl-1,3-dimethoxypropane; 2-secbutyl-2-cyclopentyl-1,3-dimethoxypropane; 2-n-pentyl-2-cyclopentyl-1,3-dimethoxypropane; 2-(2-pentyl)-2-cyclopentyl-1,3-dimethoxypropane; 2-(3-pentyl)-2-cyclopentyl-1,3-dimethoxypropane; 2-methylbutyl-2-cyclopentyl-1,3-dimethoxypropane; 2-(3-methylbut-2-yl)-2-cyclopentyl-1,3-dimethoxypropane; 2-ethyl-2-cyclohexyl-1,3-dimethoxypropane; 2-n-propyl-2-cyclohexyl-1,3-dimethoxypropane; 2-isopropyl-2-cyclohexyl-1,3-dimethoxypropane; 2-n-butyl-2-cyclohexyl-1,3-dimethoxypropane; 2-isobutyl-2-cyclohexyl-1,3-dimethoxypropane; 2-secbutyl-2-cyclohexyl-1,3-dimethoxypropane; 2-n-pentyl-2-cyclohexyl-1,3-dimethoxypropane; 2-(2-pentyl)-2-cyclohexyl-1,3-dimethoxypropane; 2-(3-pentyl)-2-cyclohexyl-1,3-dimethoxypropane; 2-methylbutyl-2-cyclohexyl-1,3-dimethoxypropane; 2-(3-methylbut-2-yl)-2-cyclohexyl-1,3-dimethoxypropane; and the corresponding 1,3-diethoxypropane analogues.

A further group of suitable diether internal donor compounds include: 9,9-bis(methoxymethyl)fluorene; 9,9-bis(methoxymethyl)-2,3,6,7-tetramethylfluorene; 9,9-bis(methoxymethyl)-2,7-dimethylfluorene; 9,9-bis(methoxymethyl)-2,7-diisoproylfluorene; 9,9-bis(methoxymethyl)-2,7-ditertbutylfluorene; 9,9-bis(methoxymethyl)-2,8-dimethylfluorene; 9,9-bis(methoxymethyl)-3,6-dimethylfluorene; 9,9-bis(methoxymethyl)-3,6-ditertbutylfluorene; 9,9-bis(methoxymethyl)-3,6-diisopropylfluorene; 9,9-bis(methoxymethyl)-4,5-dimethylfluorene; 9,9-bis(methoxymethyl)-2-methylfluorene; 9,9-bis(methoxymethyl)-4-methylfluorene; 9,10-dihydro-9,9-dimethoxyanthracene; 9,10-dihydro-9,9- diethoxyanthracene; 9,9-Dimethoxyxanthene; 9,9-Diethoxyxanthene; and the corresponding 9,9-bis(ethoxymethyl)-ananalogues.

Preferably, the diether electron donor is a compound, such as 2,2-di-isobutyl-1,3-dimethoxypropane; 2,2-di-isopropyl-1,3-dimethoxypropane; 2,2-di-cyclopentyl-1,3-dimethoxypropane; 2-isopropyl-2-isopentyl-1,3-dimethoxypropane; 2-isopropyl-2-isobutyl-1,3-dimethoxypropane; 2-isopropyl-2-cyclopentyl-dimethoxypropane; 2-ethyl-2-tert-butyl-1,3-dimethoxypropane or the corresponding 1,3-diethoxypropane analogues or 9,9-bis(methoxymethyl)fluorene or 9,9-bis(ethoxymethyl)fluorene.

Also, mixtures of two or more diether internal electron donor compounds may be used in the preparation of the solid catalytic component according to embodiments herein but the use of only one diether internal donor compound is preferred.

When used in the preparation of the particulate solid component, the diether donor compound may be used in an amount of from about 0.01 to about 2 mole, preferably from about 0.05 to about 0.6 mole, more preferably from about 0.1 to about 0.3 mole for each mole of the magnesium halide compound.

The stereospecificity and thus the XS content of the polymer produced with the solid catalytic components individually may be adjusted by synthesis procedure and/or the amount of diether added during the synthesis.

The Catalyst System:

In some embodiments, the catalyst systems herein may include (i) a first solid catalytic component containing diether or a mixture of at least two solid catalytic components containing diether producing propylene homo polymers with XS values >2 wt % and (ii) a second solid catalytic component containing diether producing homo polymer with a XS value <2 wt %, which takes the role of the external donor. In some embodiments, the first solid catalytic component may produce a propylene homopolymer having a XS value in the range from about 3 wt % to about 20 wt %; and produces a propylene homopolymer having a XS value in the range from about 4 wt % to about 10 wt % in other embodiments. In some embodiments, the second solid catalytic component may produce a propylene homopolymer having a XS value in the range from about 0.1 wt % to about 2 wt %; produces a propylene homopolymer having a XS value in the range from about 0.5 wt % to about 1.5 wt % in other embodiments. In some embodiments, the first solid catalytic component and the second solid catalytic component may individually produce a propylene homopolymer having a Xylene Solubles (XS) value differing by 1 wt % or greater (i.e., $|XS_1-XS_2|$); by 2 wt % or greater in other embodiments; and by 3, 5, 7.5, or 10 wt % or greater in yet other embodiments.

Adjustment of the XS values of the resulting polymer may be performed by varying an amount of the second solid catalytic component relative to the first solid catalytic component. In some embodiments, the ratio of the first solid catalytic component to the second solid catalytic component may be in the range from about 100:1 to about 1:100, such as in the range from about 100:1 to about 1:1, or in the range from about 1:1 to about 1:100. In other embodiments, the ratio of the first solid catalytic component to the second solid catalytic component may be in the range from about 100:1 to about 1:1, such as in the range from about 50:1 to 1:1 or from about 10:1 to about 1.1:1; in yet other embodiments, the second solid catalytic component may be varied between 0.01 wt % and 99.99 wt % relative to the first solid catalytic component, such as between 1 wt % and 99 wt %, from about 5 wt % to about 95 wt %, or from about 10 wt % to about 90 wt % relative to the first solid catalytic component. All solid catalytic components may contain the same diether or different diethers, and in some embodiments the use of the same diether is preferred.

The catalytic systems described herein, in addition to the at least two solid catalytic components, may further include at least one aluminum compound as co-catalyst. In addition to the aluminum compound(s) the catalytic systems described herein do not comprise any additional external electron donor compounds, e.g. alkoxysilanes.

Examples of suitable aluminum compounds include aluminum trialkyls and derivatives thereof wherein an alkyl group is substituted by an alkoxy group or a halogen atom, e.g., chlorine or bromine atom. The alkyl groups may be the same or different. The alkyl groups may be linear or branched chain alkyl groups. Preferred trialkylaluminum compounds are those wherein the alkyl groups each have 1 to 8 carbon atoms, such as trimethylaluminum, triethylaluminum, tri-isobutylaluminum, trioctylaluminum or methyldiethylaluminum. Triethylaluminum is the most preferred aluminum compound.

Preparation of the Catalyst System

To prepare the catalytic systems described herein, the aluminum compound as co-catalyst may be contacted with the solid catalytic components separately in any order or mixed together, normally at a temperature in the range of from about 0° C. to 200° C., preferably from about 20° C. to about 90° C. and a pressure of from about 1 to about 100 bar, in particular from about 1 to about 40 bar.

In a preferred embodiment, the catalyst components are stored in oil or liquid monomer, preferably liquid propylene, and are dosed directly into the reactor together with additional liquid propylene and the aluminum compound is dosed separately to the reactor.

Preferably, the aluminum compound co-catalyst is added in such an amount that the atomic ratio of the aluminum compound to the transition metal of the solid catalytic components is from about 10:1 to about 800:1, in particular from about 20:1 to about 200:1.

Polymerization

The catalytic systems described herein may be advantageously used in the polymerization of alk-1-enes. Suitable alk-1-enes include linear or branched C1-C10 alkenes, in particular linear C2-C10 alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalytic systems described herein, including at least two solid catalytic components with diether compounds as internal donor and as co-catalyst an aluminum compound are excellent catalytic systems for use in the production of propylene polymers, both homo polymers of propylene as well as co-polymers of propylene and one or more further alk-1-enes having up to 10 carbon atoms. The term co-polymers as used herein also refers to co-polymers wherein the further alk-1-ene having up to 10 carbon atoms is incorporated randomly. In these co-polymers in general the co-monomer content is less than about 15% by weight. The copolymers may also be in the form of so-called block or impact copolymers, which in general comprise at least a matrix of a propylene homo polymer or propylene random co-polymer containing less than 15% by weight of a further alk-1-ene having up to 10 carbon atoms and a soft phase of a propylene co-polymer (rubber phase) containing 15% to 80% by weight of further alk-1-enes having up to 10 carbon atoms. Also, mixtures of co-monomers are contemplated, resulting in, for example, ter-polymers of propylene.

The production of propylene polymers may be carried out in any common reactor suitable for the polymerization of alk-1-enes, either batchwise or, preferably, continuously, i.e., in solution, as suspension polymerization including the bulk polymerization in liquid monomer, or as gas phase polymerization. Examples of suitable reactors include continuously stirred reactors, loop reactors, fluid bed reactors, and horizontal or vertical stirred powder bed reactors. It will be understood that the polymerization may be carried out in a series of consecutively coupled reactors or in at least two reactors in parallel. The reaction time depends on the chosen reaction conditions. In general, the reaction time is from about 0.2 to about 20 hours, usually from about 0.5 to about 10 hours most preferably between 0.5 and 2 hours.

In general, the polymerization is carried out at a temperature in the range of from about 20° C. to about 150° C., preferably from about 50° C. to about 120° C., and more preferably from about 60° C. to about 95° C., and a pressure in the range of from about 1 to 100 bar, preferably from about 15 to about 50 bar, and more preferably from about 20 to about 45 bar.

The molecular weight of the resulting polymers may be controlled and adjusted over a wide range by adding polymer chain transfer or termination agents as commonly used in the art of polymerization, such as hydrogen. In addition, an inert solvent, such as toluene or hexane, or an inert gas, such as nitrogen or argon, and smaller amounts of a powdered polymer, e.g., polypropylene powder, may be added.

The weight average molecular weights of the propylene polymers produced by using the catalytic systems described herein in general are in the range of from about 10,000 to 2,000,000 g/mole and the melt flow rates are in the range of from about 0.01 to 2000 g/10 min, preferably from about 0.1 to 100 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included within the scope of embodiments herein.

The catalytic systems described herein enable polymerization of alk-1-enes producing polymers having a good morphology and a high bulk density when compared with the prior art catalytic systems. In addition, the catalytic systems may show a dramatic increase of productivity.

Catalytic systems using diether internal donors according to embodiments herein may be used to produce propylene homo polymers and copolymers having a xylene solubles content range of between 0.5 and 10 wt %, which cannot be achieved by prior art catalyst systems including diethers as an internal donor. For example, catalytic systems described herein may be used to produce a propylene polymer having a xylene solubles content of about 1.0 wt % in some embodiments; greater than 2 wt % in other embodiments; and greater than 4 wt % or 6 wt % in yet other embodiments. Catalyst systems disclosed herein may be used to produce multiple grades of propylene polymers having xylene solubles content in the range from about 0.5 wt % to about 10 wt % in some embodiments; in the range from about 1 wt % to about 6 wt % in other embodiments; and in the range from about 1.5 wt % to about 5 wt % in yet other embodiments. The variation in the xylene solubles may be achieved in some embodiments by varying an amount of one or both catalyst components, as discussed above. Advantageously, the broad range of propylene polymers may be produced according to embodiments herein by varying the relative amounts of the catalyst components and/or by adjustment of diether internal electron donor content. As a result, the compatibility of feed components (i.e., not changing external donors, etc.) and other factors resulting from catalyst systems herein may provide significant benefits to overall plant operations, such as due to ease of grade transitions, reduced materials handling, and other factors as may be recognized by one skilled in the art.

In the case of block or impact copolymers, which may be polymerized using the catalytic systems using diether internal donors according to embodiments herein in at least two polymerization steps and which in general comprise at least a matrix of a propylene homo polymer or propylene random co-polymer and a propylene co-polymer rubber, the xylene solubles content of the polymer is measured using a sample of the propylene homo polymer or propylene random co-polymer. Such a sample can be drawn from the polymerization after the homo polymer or random polymer polymerization step(s) but before the propylene copolymer rubber part is produced. Such propylene homo polymer or propylene random co-polymer matrix components have in some embodiments a xylene solubles content in the range of 0.5 to about 3.5 wt % or 0.8 to 2.5 wt % and in the range from about 1.0 to about 1.8 wt % in yet other embodiments.

The content of xylene solubles in the polymer is measured according to ISO 16152.

The xylene solubles may be separated by heating the polymer resin in boiling xylene. Upon cooling, the crystallisable part of the polymer is precipitated. The non-crystallisable fraction remains dissolved, and is referred to as the "xylene solubles" (XS).

Due to their good mechanical properties, the polymers obtainable by using the catalytic systems disclosed herein, and in particular the propylene homo polymers or the co-polymers of propylene with one or more alk-1-enes having up to 10 C-atoms, can be used advantageously for the production of pipe, film, fiber or moldings and in particular for the production of film.

Examples

Catalyst Synthesis

The general procedure and the equipment used for the synthesis of the catalyst components are described in patent application WO 2009/152268 A1, which is incorporated herein by reference to the extent not contradictory with embodiments disclosed herein.

Catalysts were made using sixty micron support (d50) with a span [d50/(d90–d10)] of 0.8 of spherical $MgCl_2$-xEtOH, where x is 3.1. If not mentioned otherwise, for each catalyst preparation a mixture of 70 wt % $TiCl_4$ and 30 wt % heptane were initially charged to the glass reactor and cooled down to temperatures of about –5° C. Then the $MgCl_2$-3.1EtOH support was added over a period of about 45 minutes while maintaining temperatures below 0° C. The molar ratio of Mg/Ti used is provided for each catalyst below.

While the actual quantities of the initial charges vary slightly for each catalyst preparation run, the initial charge was based on using 10 g of $MgCl_2$-3.1EtOH support, unless noted otherwise. After the $MgCl_2$ support addition, the temperature was increased at approximately 1° C. per minute to 50° C. or to 80° C. Then the internal donor (ID), e.g.

diether or D-i-BP (di-1-butyl phthalate) was added. The molar ratio of the internal donor (ID) to Mg is provided for each catalyst below.

If not mentioned otherwise, the suspension was then heated to 105° C. and held there for 1 to 3 hours. Afterwards the reactor contents were transferred to a Soxhlet extraction device, filtered while still hot and then washed with heptane. Then the precatalyst was Soxhlet-extracted for approximately 2 hours with a 90/10 volume mixture of ethylbenzene and $TiCl_4$ at the boiling temperature of the mixture. After extraction the catalyst was washed three times with 100 ml heptane and vacuum dried for 2 h, which results in a residual solvent content of less than 2 wt % for the catalytic components and comparative catalysts.

One or more parameters were varied for each catalyst preparation. The parameters used and any change from the procedure are noted in the following.

Synthesis of the Catalytic Components

Catalytic Component 1:

The molar ratio of Mg/Ti was 1:21. As internal donor 2-isopropyl-2-isopentyl-dimethoxypropane with an ID/Mg ratio of 0.25 was added at 80° C. The suspension was allowed to react at 105° C. for 1.5 hours.

Catalytic Component 2:

The molar ratio of Mg/Ti was 1:21. As internal donor 2-isopropyl-2-isopentyl-dimethoxypropane with an ID/Mg ratio of 0.35 was added at 80° C. The suspension was allowed to react at 105° C. for 3 hours.

Catalytic Component 3:

The molar ratio of Mg/Ti was 1:20. As internal donor 2-isopropyl-2-isopentyl-dimethoxypropane with an ID/Mg ratio of 0.25 was added at 80° C., The suspension was allowed to react at 105° C. for 3 hours.

Catalytic Component 4:

The molar ratio of Mg/Ti was 1:20. As internal donor 2-isopropyl-2-isopentyl-dimethoxypropane with an ID/Mg ratio of 0.15 was added at 80° C. The suspension was allowed to react at 105° C. for 3 hours.

Catalytic Component 5:

The molar ratio of Mg/Ti was 1:20. As internal donor 9,9-Bis(methoxymethyl)fluorene with an ID/Mg ratio of 0.15 was added at 80° C. After addition of the internal donor the suspension was held at 80° C. for 1 hour. Then the suspension was allowed to react at 105° C. for 1 hour.

Catalytic Component 6:

The molar ratio of Mg/Ti was 1:20. As internal donor 9,9-Bis(methoxymethyl)fluorene with an ID/Mg ratio of 0.25 was added at 80° C. After addition of the internal donor the suspension was held at 80° C. for 1 hour. Then the suspension was allowed to react at 105° C. for 1 hour.

Catalytic Component 7:

The molar ratio of Mg/Ti was 1:20. As internal donor 9,9-Bis(methoxymethyl)fluorene with an ID/Mg ratio of 0.25 was added at 80° C. After addition of the internal donor the suspension was held at 80° C. for 1 hour. Then the suspension was allowed to react at 105° C. for 3 hour.

Catalytic Component 8:

The molar ratio of Mg/Ti was 1:21. As internal donor 9,9-Bis(methoxymethyl)fluorene with an ID/Mg ratio of 0.20 was added at 80° C. After addition of the internal donor the suspension was held at 80° C. for 1 hour. Then the suspension was allowed to react at 105° C. for 1 hour.

Catalytic Component 9:

The molar ratio of Mg/Ti was 1:10, while 20 g of the support was added over 90 min. As internal donor 9,9-Bis (methoxymethyl)fluorene with an ID/Mg ratio of 0.25 was added at 80° C. After addition of the internal donor the suspension was held at 80° C. for 1 hour. Then the suspension was allowed to react at 105° C. for 3 hour.

Catalytic Component 10:

The molar ratio of Mg/Ti was 1:21. As internal donor 9,9-Bis(methoxymethyl)fluorene with an ID/Mg ratio of 0.15 was added at 50° C. After addition of the internal donor the suspension was held at 50° C. for 1 hour. Then the suspension was allowed to react at 105° C. for 1.5 hour. After heptane wash the precatalyst was not Soxhlet extracted. Instead the solid was treated two times with 150 ml TiCl4 at 125° C. for 2 hours.

Catalytic Component 11:

The molar ratio of Mg/Ti was 1:10, while 20 g of the support was added over 90 min. As internal donor 9,9-Bis (methoxymethyl)fluorene with an ID/Mg ratio of 0.25 was added at 80° C. After addition of the internal donor the suspension was held at 80° C. for 1 hour. Then the suspension was allowed to react at 105° C. for 1 hour. After ethylbenzene wash the precatalyst was not soxhlet extracted. Instead the solid was treated two times with a mixture of 50 ml TiCl4 and 100 ml ethylbenzene at 125° C. for 2 hours.

Synthesis of Non-Inventive Catalysts Using Phthalate as Internal Donor (ID)

Comparative Catalyst A:

The molar ratio of Mg/Ti was 1:10, while 20 g of the support was added over 90 min. As internal donor di-iso-butyl-phthalate with an ID/Mg ratio of 0.25 was added at 50° C. After addition of the internal donor the suspension was held at 50° C. for 1 hour. Then the suspension was allowed to react at 105° C. for 1.5 hour.

Comparative Catalyst B:

The molar ratio of Mg/Ti was 1:10, while 20 g of the support was added over 90 min. As internal donor di-iso-butyl-phthalate with an ID/Mg ratio of 0.15 was added at 50° C. After addition of the internal donor the suspension was held at 50° C. for 1 hour. Then the suspension was allowed to react at 105° C. for 1.5 hour.

The titanium, magnesium and carbon content by weight percentage of the catalytic components are summarized in table 1. The comparative examples are found at the bottom of the table.

TABLE 1

Ti, Mg AND C - CONTENT OF CATALYTIC COMPONENTS

| Catalytic Component | Ti [wt. %] | Mg [wt. %] | C [wt. %] |
|---|---|---|---|
| 1 | 2.2 | 17.8 | 15.9 |
| 2 | 2.4 | 17.6 | 15.4 |
| 3 | 2.4 | 17.5 | 15.7 |
| 4 | 4.9 | 16.1 | 13.5 |
| 5 | 3.8 | 14.7 | 19.6 |
| 6 | 2.6 | 14.8 | 25.1 |
| 7 | 3.4 | 13.1 | 26.4 |
| 8 | 3.2 | 14.2 | 22.9 |
| 9 | 3.5 | 14.5 | 24.3 |
| 10 | 4.7 | 14.2 | 22.6 |
| 11 | 2.4 | 14.7 | 25.6 |
| Comp. catalyst A | 3.6 | 13.7 | 18.4 |
| Comp. catalyst B | 2.0 | 17.9 | 11.5 |

Polymerization Testing

The performance of the catalyst components and the catalyst systems in comparison with the comparative phthalate based catalysts was tested under both bulk polymerization and gas phase polymerization conditions.

If not mentioned otherwise, bulk polymerization testing was performed using a 5-liter reactor equipped with a helical stirrer, 1800 grams of propylene, optionally 2.0 ml external electron donor compound, 9.0 ml of 1.3 M triethylaluminum (TEA1), and 0.5 grams of hydrogen, which were added to the reactor at 25° C. in the following order: after addition of hydrogen, TEA1 and optionally silane were premixed and then flushed into the reactor using 900 grams of propylene. The last components added were the ~0.01 grams of catalyst using the remaining 900 grams of propylene. Under constant stirring at 200 rpm, the reactor was then heated quickly to 70° C., usually within 10 minutes, and the polymerization run was allowed to proceed for 1 hour in liquid propylene as suspension medium.

The same bench scale reactor which was used for the bulk polymerizations was used for the gas phase polymerizations. If not mentioned otherwise, under gas phase conditions the order of addition was the same, but the propylene charges are reduced in size to ~180 grams, while 2.5 ml TEA1, optionally an external donor compound and 0.5 g hydrogen were added. The catalyst was injected at 40° C. and the reactor programmed to heat to 75° C. over 10 minutes. Gas phase conditions were maintained by controlling the introduction of the propylene into the system. As the system was heated up to final temperature, the propylene was added at a rate to ensure that the pressure in the reactor vessel is such that the propylene always remains in the gas phase. To insure gas phase conditions, the reactor pressure was maintained at 26.7 bar at 75° C. with gaseous propylene being added though a mass flow meter upon demand.

As external donors, donor compounds cyclohexyl-(methyl)-dimethoxysilane and dicyclopentyl-dimethoxysilane were used; below indicated by C and D, respectively. Furthermore, the diether compound 2-isopentyl-2-isopropyl-dimethoxypropane was also used as external donor. For the polymerizations, all external donors were diluted with heptane, obtaining a 0.1 M solution.

When, according to the invention, a catalytic system is used to control the stereo selectivity, the relative mass ratio of the catalyst components (RSC) based on the sum of all catalyst components is mentioned. Thus the following equation can be applied:

$$RSC=m(A)/[m(A)+m(B)+m(C)+ \ldots +m(Z)]$$

where:
RSC=relative mass ratio of the catalyst components
m(A)=mass of the catalytic component, controlling the stereo selectivity and producing a homo polymer with a XS lower than 2 wt. %
m(B), m(C), . . . , m(Z)=mass of catalytic component, producing a homo polymer with a XS greater than 2 wt. %

For example the relative mass ratio (RSC) is 0.2 when using 8 mg of a first catalyst component producing a homo polymer with a XS greater than 2 wt. % and 2 mg of a second catalyst component producing a homo polymer with a XS lower than 2 wt. %. To constitute the catalyst system, the catalyst components were premixed before introduction into the reactor vessel.

The physical characteristics of the polypropylene polymers produced using the various catalyst components and/or catalyst systems were determined using the tests described below.

Activity.

The activity results reported throughout this study are based upon polymer yield in kilograms divided by the weight of the catalyst system charged to the reactor in grams for a 1-hour polymerization.

Xylene Solubles (wt % XS).

Xylene solubles were measured using Viscotek's Flow Injector Polymer Analysis (FIPA) technique which is well known in the industry. Viscotek has published an article entitled, "*FIPA for xylene soluble determination of polypropylene and impact copolymers*" showing that the Viscotek FIPA method exhibits a 0.994 $r^2$ correlation with ASTM Method D5492-06 (equivalent to ISO 16152) over the range of 0.3% to 20% Xylene solubles. Therefore, one of ordinary skill in the art could reproduce the inventive results using either the Viscotek FIPA method or ASTM Method D5492-06. The weight percent of xylene solubles in the polypropylene is an indication of the stereoregulating ability of the catalyst component or catalyst system—the higher the wt % XS, the lower the stereospecificity of the catalyst. While higher XS values are required for applications like the BOPP film production process, low XS values are of value for applications like injection moulding.

Melt Flow Rate (MFR) Measurement.

The melt flow rate effect was measured using ASTM Method D 1238-04. For each 5 gram sample of polymer, 0.2 grams of a standard stabilizing package was added. The additive package consists of 50 wt. % Irganox 1010 and 50 wt. % Irgafos 168. Because the polymer is exposed to air at 230° C. for several minutes during the test, this package is added to inhibit thermal and oxidative degradation of the polymer. The melt flow rate provides information concerning the molecular weight and the hydrogen response of the polymer. The higher the MFR, the higher the hydrogen response rate of the catalyst that produced the polyolefin. Similarly, the higher the MFR, the lower the molecular weight of the polymer.

Molecular Weight Distribution.

The Polydispersity Index (PI) was determined by rheology using a dynamic shear test, the so called Dynamic Oscillatory Rate Sweep (DORS). A sample in the form of a compression molded disk is loaded between a parallel plate-to-plate geometry. The measurements were performed at T=210° C. in a frequency range between 0.1 and 400 rad/s. The Polydispersity Index (PI), which is correlated to the ratio of the weight (Mw) to number (Mn) average molecular weights, is calculated from the crossover modulus as follows: PI=$10^5$ Pa/$G_c$, where $G_c$=dynamic storage modulus (G')=dynamic loss modulus (G") at the crossover frequency.

The Temperature Rising Elution Fractionation.

The temperature rising elution fractionation (TREF) of the polymer samples was performed by using an automated CRY STAF-TREF 300 instrument (PolymerChar S.A., Valencia Technology Park, P.O. Box 176, Valencia, Va., E-46980, PATERNA, Spain), equipped with heated infrared (IR) concentration detector with composition sensor, and capillary viscometer detector. Polymer solutions were prepared at a concentration of 3±0.25 mg/ml in 1,2-dichlorobenzene (stabilized with 300 ppm 2,6-di-tert-butyl-4-methylphenol) at 150° C. for 90 minutes. After dissolution step is finished the sample is automatically transferred to the TREF column where the stabilization, crystallization and elution cycles take place. During the stabilization the column is cooled down from 150 to 95° C. at 40° C./min and then isothermally kept at this temperature for 45 min. The crystallization step is carried out by cooling down from 95° C. down to 35° C. at a cooling rate of 0.5° C./min. At the end of the crystallization step the column is stabilized at 35° C. for 10 minutes. After this stabilization period the content of the column is eluted for 10 minutes to collect the soluble fraction. The elution step is carried out from 35 to 140° C.

at a heating rate of 1° C./min, while maintaining a constant solvent flow rate of 0.5 ml/min. Data acquisition and processing was done using the software provided by Polymer-Char. The TREF plot was normalized to 100% integral including the soluble fraction.

Activity of the Catalyst Components Based Upon Polymerization Testing

Tables 2 and 3 summarize the bulk and gas phase polymerization results, respectively, that were obtained solely with the catalytic components described above. The usage of silane C as external electron donor compound (ED) is indicated in column 3. The comparative examples are found at the bottom of the tables.

TABLE 2

BULK PHASE POLYMERIZATION RESULTS

| Example | Catalytic Component | ED | Activity [KgPP/g-cat.] | MFR/ [g/10 min] | XS/ [wt. %] | PI |
|---|---|---|---|---|---|---|
| 1 | 1 | — | 73.5 | 52.4 | 0.7 | 4.1 |
| 2 | 2 | — | 79.1 | 46.7 | 1.2 | 4.0 |
| 3 | 3 | — | 68.7 | 89.0 | 1.9 | 4.0 |
| 4 | 4 | — | 61.5 | 136.3 | 9.1 | 5.2 |
| 5 | 6 | — | 54.6 | 81.9 | 2.2 | 4.2 |
| 6 | 7 | — | 89.4 | 64.6 | 3.8 | 4.0 |
| 7 | 8 | — | 63.1 | 66.5 | 3.7 | 4.1 |
| 8 | 9 | — | 81.3 | 90.4 | 3.7 | 4.0 |
| 9 | 10 | — | 54.3 | 121.3 | 8.8 | 4.1 |
| 10 | 11 | — | 53.5 | 74.6 | 1.4 | 4.0 |
| Comp. 1 | Comp. catalyst A | — | 21.6 | 525.6 | 33.5 | 4.1 |
| Comp. 2 | Comp. catalyst A | C | 47.1 | 31.1 | 2.2 | 4.2 |

TABLE 3

GAS PHASE POLYMERIZATION RESULTS

| Example | Catalytic Component | ED | Activity [KgPP/g-cat.] | MFR/ [g/10 min] | XS/ [wt. %] | PI |
|---|---|---|---|---|---|---|
| 11 | 1 | — | 35.4 | 9.3 | 1.2 | 4.5 |
| 12 | 2 | — | 31.3 | 8.2 | 1.8 | 3.7 |
| 13 | 3 | — | 31.8 | 10.8 | 2.4 | 4.0 |
| 14 | 4 | — | 28.6 | 22.9 | 9.4 | 4.3 |
| 15 | 5 | — | 38.0 | 26.9 | 6.3 | 3.9 |
| 16 | 6 | — | 43.3 | 20.0 | 1.7 | 3.8 |
| 17 | 7 | — | 39.3 | 11.9 | 4.6 | 3.9 |
| 18 | 8 | — | 29.2 | 15.0 | 2.6 | 3.8 |
| 19 | 9 | — | 54.4 | 25.4 | 3.7 | 3.8 |
| 20 | 10 | — | 39.1 | 21.3 | 7.0 | 3.8 |
| 21 | 11 | — | 31.5 | 16.2 | 1.7 | 4.0 |
| Comp. 3 | Comp. A | — | 16.6 | 61.9 | 29.3 | 4.0 |
| Comp. 4 | Comp. A | C | 30.4 | 10.0 | 1.2 | 3.9 |

The results in Table 2 and 3 clearly show that the exemplary diether catalyst components of the present invention exhibited significantly higher activity and stereo selectivity without silane as external electron donor compound in the polymerization process than the comparative catalysts A, while the polydispersity index (PI) is surprisingly comparable for all catalysts.

A high stereo selectivity with a catalyst containing phthalate, e.g. comparative catalysts A can be obtained only in the presence of an external electron donor compound. Simultaneously with the decrease of the XS value the activity increases significantly. Even under these conditions the diether catalyst components show a comparable or even higher activity within a broad XS range. For example under bulk polymerization condition catalyst component 6 shows an activity of 54.6 kg/g-cat without any stereo modifier and comparative catalyst A shows an activity of 47.1 kg/g-cat in the presence of a silane, while the XS and PI values of both homo polymers are comparable (see example 5 and comp. example 2).

The stereo selectivity of the catalyst components can be adjusted by various synthesis parameters. One is the amount of diether as internal donor used for the synthesis, exemplary shown with catalytic components 2 to 4 (see example 2 to 4 and 12 to 14). Here with increasing ID/Mg ratio during the synthesis the stereo selectivity increases, resulting in lower XS value in the polymer, see table 2 and 3. Other exemplary parameters are the reaction time and temperature (80 or 105° C.), the Mg/Ti ratio as well as the applied activation procedure.

Table 4 summarizes comparative gas phase polymerization results that were obtained with the catalytic components of the present invention described above and a silane as non-inventive catalytic system. For the polymerization 0.05 g of hydrogen and 0.3 ml silane were added. As external electron donor compound the silanes C or D were used.

TABLE 4

NON INVENTIVE GAS PHASE POLYMERIZATION RESULTS

| Example | Catalytic Component | ED | Activity [KgPP/g-cat.] | MFR/ [g/10 min] | XS/ [wt. %] | PI |
|---|---|---|---|---|---|---|
| Comp. 5 | Comp. catalyst A | C | 28.3 | 6.5 | 1.5 | 4.5 |
| Comp. 6 | Comp. catalyst B | C | 27.9 | 6.2 | 1.3 | 4.1 |
| Comp. 7 | Comp. catalyst B | D | 30.6 | 0.5 | 0.6 | 4.3 |
| Comp. 8 | 7 | C | 25.2 | 5.8 | 2.9 | 4.3 |
| Comp. 9 | 7 | D | 20.4 | 5.4 | 2.5 | 4.5 |
| Comp. 10 | 6 | D | 15.3 | 6.5 | 1.1 | 4.1 |
| Comp. 11 | 3 | D | 14.9 | 4.2 | 1.3 | 4.7 |
| Comp. 12 | 1 | D | 17.7 | 3.2 | 0.9 | 5.0 |

Table 4 shows that in contrast to the comparative catalysts A and B in the presence of a silane the activities of the diether based catalyst components decrease significantly, while the increase in stereo selectivity which can be translated with a decrease in the XS values is less pronounced. For example under gas phase polymerization conditions the usage of 0.3 ml of silane C causes a reduction of the XS from 29.3 to 1.5 wt % for comparative catalyst A, while the activity increases by a factor of 1.7 (Comp. examples 4 vs. Comp. example 5). For catalytic component 7 the XS decreases only from 4.6 to 2.9 wt % and simultaneously the activity decreased by ~40% (Example 17 vs. Comp. example 8).

The stereo selectivity as well as the activity of a catalyst containing phthalate as internal donor increases when replacing silane C by silane D, which results in a further decrease of the XS value from 1.3 to 0.6 wt % for comparative catalyst B (Comp. examples 6 vs. Comp. example 7). Nevertheless, even with silane D a XS value lower than 2.5 wt % cannot be achieved with catalytic component 7 containing a diether as internal donor (Comp. example 9). Thus for lower XS values another diether based catalyst component producing a lower XS value without the need to use an external electron donor has to be applied, e.g. catalytic components 1, 3 or 6 (Example 11 vs. Comp. example 12; example 13 vs. Comp. example 11; example 16 vs. Comp. example 10).

Figure 2:
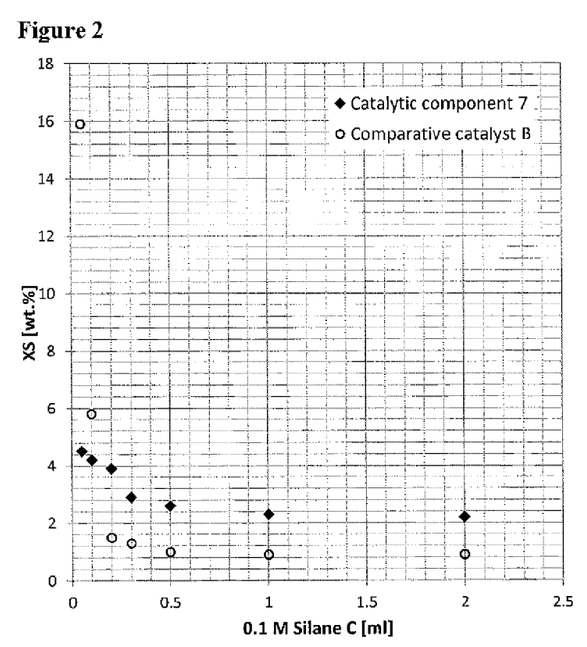
FIGS. 2-5 present experimental results for catalyst systems according to embodiments herein and comparative examples.

Table 5 compares the response of silane C with comparative catalyst B and catalytic component 7, while the amount of used silane is indicated in column 1. The results are also shown in FIG. 2.

TABLE 5

NON INVENTIVE GAS PHASE POLYMERIZATION RESULTS

| Example | Amount of 0.1M Silane [ml] | XS Value of catalytic component 7 [wt. %] | XS Value of comparative catalyst B [wt. %] |
|---|---|---|---|
| Comp. 13 | 0.05 | 4.5 | 15.9 |
| Comp. 14 | 0.1 | 4.2 | 5.8 |
| Comp. 15 | 0.2 | 3.9 | 1.5 |
| Comp. 16 | 0.3 | 2.9 | 1.3 |
| Comp. 17 | 0.5 | 2.6 | 1.0 |
| Comp. 18 | 1.0 | 2.3 | 0.9 |
| Comp. 19 | 2.0 | 2.2 | 0.9 |

Table 5 and FIG. 2 clearly show that the accessible XS range of catalytic component 7 containing diether as internal donor is limited compared to comparative catalyst B containing phthalate as internal donor. Here with silane C the comparative catalyst B has an accessible XS range between 16 to about 1 wt. %, while the diether catalyst component 7 is limited to a small range between 4.5 and 2.2 wt. %. Thus low or higher XS products cannot be produced, which heavily restricts the accessible product range.

Additionally, FIG. 2 also shows the disadvantage of a catalytic system containing phthalate as internal donor and silane as external electron donor compound. Only a slight change of the amount of silane causes a significant change in the XS value (Comp. example 13 vs. comp. example 14 of comparative catalyst B). Such a behavior makes it rather challenging to run a commercial plant without considerable fluctuation of the XS content of the polymer.

Another external electron donor compound option could be an additional diether compound. Table 6 summarizes polymerization results obtained with catalytic component 1 and 2-isopentyl-2-isoproyl-diemethoxypropane as external electron donor compound as non-inventive catalytic system. The amount of used external donor is indicated in column 2.

TABLE 6

NON INVENTIVE GAS PHASE POLYMERIZATION RESULTS

| Example | ED | Activity [KgPP/g-cat.] | MFR/ [g/10 min] | XS/ [wt. %] | PI |
|---|---|---|---|---|---|
| Comp. 20 | 0.5 | 17.4 | 6.8 | 0.7 | 4.5 |
| Comp. 21 | 1.0 | 18.4 | 6.1 | 0.6 | 4.5 |
| Comp. 22 | 2.5 | 16.3 | 4.8 | 0.6 | 4.6 |

The results in table 6 show that it is possible to obtain lower XS values with a diether as external electron donor compound. But in terms of activity the same strong reduction occurs, comparable to silanes. Even when accepting a lower activity the adjustment of the XS value would be as difficult as with the combination of a phthalate catalyst with a silane as external electron donor compound.

Table 7 summarizes polymerization results of catalyst systems, where a second catalyst component producing low XS polymer is used as stereo selectivity control agent instead of a silane or a diether. The relative mass ratio of the catalyst components (RSC) was set to 0.5.

TABLE 7

GAS PHASE POLYMERIZATION RESULTS USING A TWO CATALYTIC COMPONENT CATALYST SYSTEM

| Example | Catalytic Component | 2nd Catalytic Component | Activity [KgPP/g-cat.] | MFR/ [g/10 min] | XS/ [wt. %] | PI |
|---|---|---|---|---|---|---|
| 22 | 4 | 2 | 30.4 | 14.5 | 5.6 | 4.0 |
| 23 | 5 | 6 | 39.7 | 20.4 | 3.9 | 4.0 |
| 24 | 7 | 6 | 42.7 | 14.7 | 2.8 | 3.9 |
| 25 | 8 | 1 | 29.3 | 12.2 | 1.9 | 4.3 |
| 26 | 10 | 6 | 41.0 | 20.7 | 4.7 | 4.2 |
| 27 | 10 | 11 | 34.3 | 19.1 | 4.5 | 4.0 |
| 28* | 9 | 3 | 75.2 | 84.1 | 2.7 | 4.0 |

*Polymerization was performed under bulk conditions

As summarized in table 7 the different catalyst systems show high activities, while the XS value can be varied by using two catalyst components. Surprisingly, a second diether based catalyst component producing a homo polymer with a XS lower than 2 wt % can replace the silane acting as external electron donor compound, while maintaining the catalysts activities.

Figure 3:
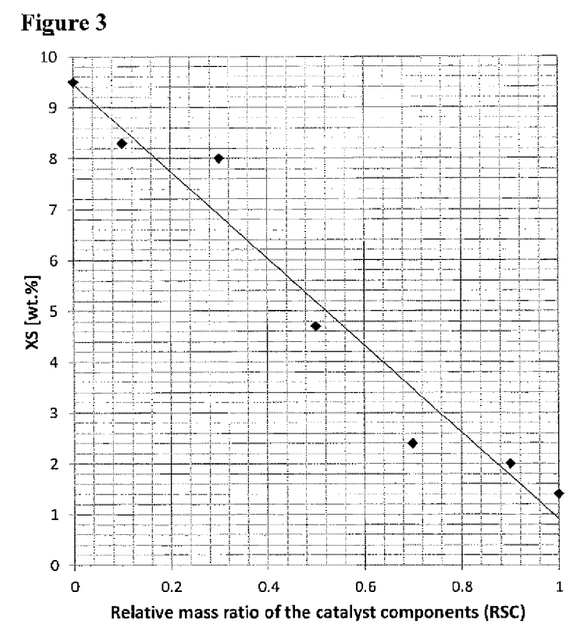

Table 8 summarizes polymerization results of diether based catalyst component 4 in the presents of catalyst component 1 producing a homo polymer with a XS lower than 2 wt %. For the polymerization the H2 concentration was set to 0.03 g, while the relative mass ratio of the catalyst components (RSC) was varied as shown in column 2. The XS value vs. RSC is also shown in FIG. 3.

TABLE 8

INVENTIVE GAS PHASE POLYMERIZATION RESULTS WITH CATALYST SYSTEM

| Example | RSC | Activity [KgPP/g-cat.] | MFR/ [g/10 min] | XS/[wt. %] |
|---|---|---|---|---|
| 29 | 0.0 | 26.1 | 5.3 | 9.5 |
| 30 | 0.1 | 26.4 | 4.1 | 8.3 |
| 31 | 0.3 | 27.5 | 3.5 | 8.0 |
| 32 | 0.5 | 27.6 | 2.8 | 4.7 |
| 33 | 0.7 | 28.5 | 2.6 | 2.4 |
| 34 | 0.9 | 27.6 | 2.3 | 2.0 |
| 35 | 1.0 | 28.8 | 2.0 | 1.4 |

Surprisingly, using a second "low XS" diether based catalyst component as stereo selectivity control agent, the XS values can be varied unexpectedly easy. Quite contrary to the expectations, there is a linear relationship between the XS values and the amount of the stereo selectivity control catalyst, see FIG. 3. This broadens the XS range of the diether based catalyst component producing a homo polymer with a XS greater than 2 wt. % significantly, while the upper and the lower XS value limitation is given solely by the catalyst components.

Figure 4:
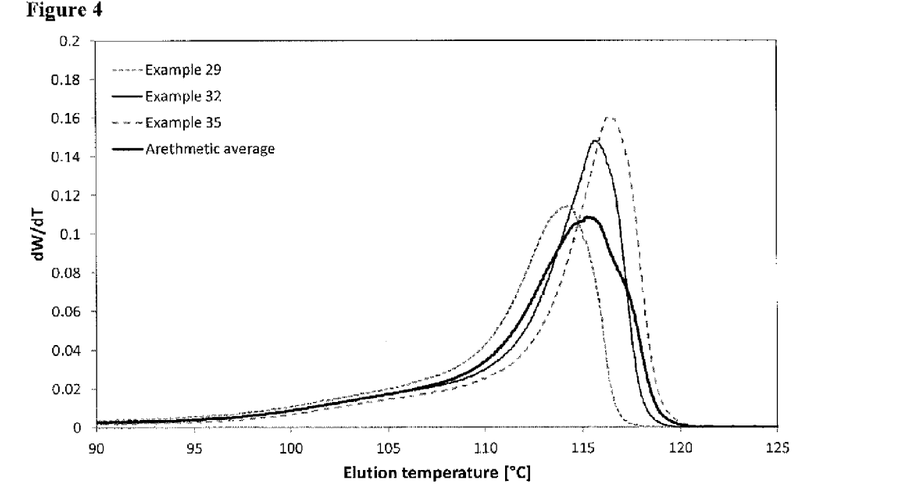

Temperature rising elution fraction (TREF) curves of examples 29, 32 and 35 in the temperature region between 90 and 125'C are shown in FIG. 4, which represent the distribution of the longest crystallizable/isotactic sequence in the chain of a polymer. The first and the latter examples are the curves of polymer produced with the single catalytic components 4 and 1, respectively, while example 32 is polymer produced with a relative mass ratio of the catalyst components (RSC) of 0.5. Additionally, the arithmetic average of the curves of example 29 and 35 is shown, which would be expected for example 32 by one of ordinary skill in the art.

The peak maximum of the elution temperature of example 32 is 115.6° C., which is between the single components. The value fits well with the expected arithmetical average (115.3° C.) of example 29 (114.2° C.) and example 35 (116.4° C.), see also FIG. 4.

Quite contrary to expectations, no broadening of the curve of example 32 is observed. Normally one of ordinary skill in the art would expect an increase of the half width in the following order: example 35<29<32. Thus comparing the curve of example 32 and the expected arithmetic average in FIG. 4 the properties of a polymer evaluated by TREF are somehow influenced by using a catalyst system where a catalytic component producing low XS polymer is used for controlling the stereo selectivity.

Figure 5:
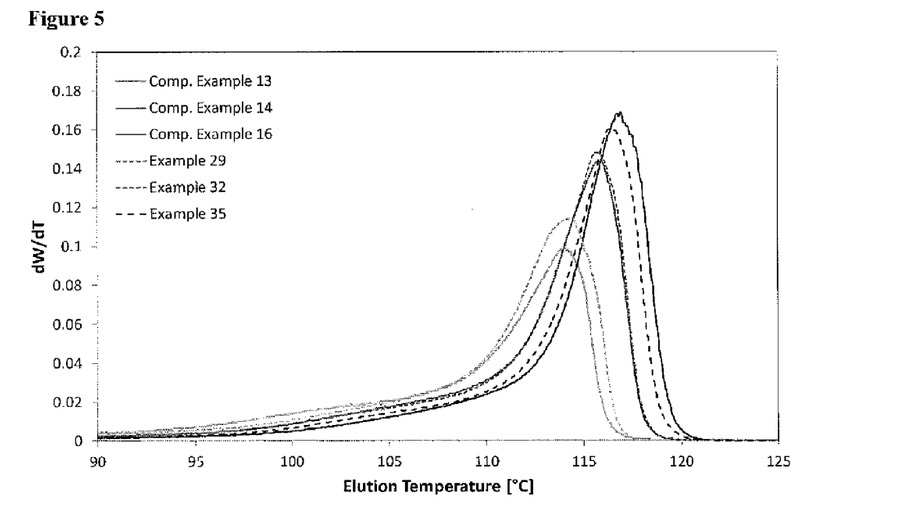

Unexpectedly, FIG. 5 shows that using a two diether catalysts system (bold curves; examples 29, 32 and 35) the curve shape of the polymer evaluated by TREF is comparable to a phthalate catalyst and silane system (doted curves; Comp. examples 13, 14 and 16). Independent of using a silane or a diether catalytic component, with increasing amount of stereo selectivity control component in the polymerization the maximum elution temperature increases, which is accompanied by a decrease of the half-width.

As described above, embodiments disclosed herein provide for unique catalytic systems comprising a combination of at least two solid catalytic components with diether compounds as internal donor, while one solid catalytic component takes the role of the liquid external donor, e.g. alkoxysilane for controlling the stereospecificity of the polymer. Advantageously, embodiments disclosed herein may provide for improved catalytic systems of the Ziegler-Natta type with an excellent hydrogen response and stereo selectivity as well as an improved control of the stereospecificity where the xylene solubles content of the polymer can be adjusted between 0.5 and 10 wt %. In addition, the catalyst has a high activity and allows the production of polymers of α-alk-1-enes having a good morphology and bulk density.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A catalyst system useful for the polymerization of propylene or propylene copolymers, comprising:
   a first solid catalytic component comprising:
      a spherical $MgCl_2$-xROH support, where x is in the range from about 1 to about 10 and wherein ROH is an alcohol or a mixture of at least two different alcohols;
      a group 4-8 transition metal; and
      a diether internal electron donor;
   a second solid catalytic component comprising:
      a spherical $MgCl_2$-xROH support, where x is in the range from about 1 to about 10 and wherein ROH is an alcohol or a mixture of at least two different alcohols;
      a group 4-8 transition metal; and
      a diether internal electron donor;
   wherein the molar ratio of diether internal electron donor to Mg in the first solid catalytic component is such that:
      the first solid catalytic component produces a propylene homopolymer having a xylene solubles (XS) value of greater than 2 wt %; and
   wherein the molar ratio of diether internal electron donor to Mg in the second solid catalytic component is such that:
      the second solid catalytic component produces a propylene homopolymer having a XS value of less than 2 wt %.

2. The catalyst system of claim 1, wherein the first solid catalytic component produces a propylene homopolymer having a XS value in the range from about 3 wt % to about 20 wt %.

3. The catalyst system of claim 1, wherein the first solid catalytic component produces a propylene homopolymer having a XS value in the range from about 4 wt % to about 10 wt %.

4. The catalyst system of claim 1, wherein the second solid catalytic component produces a propylene homopolymer having a XS value in the range from about 0.1 wt % to about 2 wt %.

5. The catalyst system of claim 1, wherein the second solid catalytic component produces a propylene homopolymer having a XS value in the range from about 0.5 wt % to about 1.5 wt %.

6. The catalyst system of claim 1, wherein the catalyst system does not comprise any additional internal or external donors.

7. The catalyst system of claim 1, wherein the catalyst system further comprises an aluminum compound cocatalyst.

8. The catalyst system of claim 1, wherein the first and second solid catalytic components each independently have an average particle size ($d_{50}$) in the range from about 10 microns to about 200 microns.

9. The catalyst system of claim 1, wherein the diether electron donor of the first and second solid catalytic components are each independently a diether represented by the general structure (I):

$$R^1O-(CR^5R^6)_n-CR^3R^4-(CR^7R^8)_m-OR^2 \quad (I)$$

where
   $R^1$ and $R^2$ are the same or different and are selected from the group consisting of a saturated or unsaturated aliphatic group of from 1 to about 20 carbon atoms or an aryl group of from 6 to about 20 carbon atoms,
   n+m=2 to 4,
   $R^3$ and $R^4$ are identical or different and are each a linear, cyclic or branched hydrocarbon group optionally containing one or more hetero atoms Si, B, Al, O, S, N or P, and optionally containing a halogen atom F, Cl or Br, and/or the two radicals $R^3$ and $R^4$ form a hydrocarbon ring system
   $R^5$, $R^6$, $R^7$ and $R^8$ are identical or different and are each a hydrogen atom or a linear, cyclic or branched hydrocarbon group optionally containing one or more hetero atoms Si, B, Al, O, S, N or P, and optionally containing a halogen atom F, Cl or Br.

10. The catalyst system of claim 1, wherein the diether electron donor of the first and second solid catalytic components are each independently a diether represented by the general structure (II):

$$R^1O-CH_2-CR^3R^4-CH_2-OR^2 \quad (II)$$

where
   $R^1$ and $R^2$ are the same or different and are selected from the group consisting of a saturated or unsaturated aliphatic group of from 1 to about 20 carbon atoms,
   $R^3$ and $R^4$ are identical or different and are each a linear, cyclic or branched hydrocarbon group selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms and an arylalkenyl group of from 8 to about 40 carbon atoms, and optionally contain one or more hetero atoms Si, B, Al, O, S, N or P, and/or optionally contain halogen atoms F, Cl or Br, and/or the two radicals $R^3$ and $R^4$ form a hydrocarbon ring system.

11. The catalyst system of claim 1, wherein the diether electron donor of the first and second solid catalytic components are each independently a diether represented by the general structure (III):

$$R^1O-CH_2-CR^3R^4-CH_2-OR^2 \quad (III)$$

where
$R^1$ and $R^2$ are identical and are selected from the group consisting of an alkyl group of from 1 to about 10 carbon atoms,
$R^3$ and $R^4$ are identical or different and are each a linear, cyclic or branched hydrocarbon group selected from the group consisting of an alkyl group of from 1 to about 10 carbon atoms, an alkenyl group of from 2 to about 10 carbon atoms, an aryl group of from 6 to about 10 carbon atoms, an arylalkyl group of from 7 to about 40 carbon atoms, an alkylaryl group of from 7 to about 40 carbon atoms and an arylalkenyl group of from 8 to about 40 carbon atoms, and optionally the two radicals $R^3$ and $R^4$ form a hydrocarbon ring system, and optionally $R^3$ and $R^4$ contain one or more hetero atoms Si, O, S, N or P.

12. The catalyst system of claim 1, wherein the diether electron donor of the first and second solid catalytic components are each independently a diether or mixture of diethers selected from the group consisting of: 2,2-di-isobutyl-1,3-dimethoxypropane; 2,2-di-isopropyl-1,3-dimethoxypropane; 2,2-di-cyclopentyl-1,3-dimethoxypropane; 2-isopropyl-2-isopentyl-1,3-dimethoxypropane; 2-isopropyl-2-isobutyl-1,3-dimethoxypropane; isopropyl-2-cyclopentyl-dimethoxypropane; 2-ethyl-2-tert-butyl-1,3-dimethoxypropane; di-isobutyl-1,3-diethoxypropane; 2,2-di-isopropyl-1,3-diethoxypropane; 2,2-di-cyclopentyl-1,3-diethoxypropane; 2-isopropyl-2-isopentyl-1,3-diethoxypropane; 2-isopropyl-2-isobutyl-1,3-diethoxypropane; 2-isopropyl-2-cyclopentyl-diethoxypropane; 2-ethyl-2-tert-butyl-1,3-diethoxypropane; 9,9-bis(methoxymethyl) fluorene; and 9,9-bis(ethoxymethyl) fluorene.

13. A catalyst system useful for the polymerization of propylene or propylene copolymers, comprising
a first solid catalytic component comprising:
a $MgCl_2$-xROH support, where x is in the range from about 1 to about 10 and wherein ROH is an alcohol or a mixture of at least two different alcohols;
a group 44 transition metal; and
a diether internal electron donor;
a second solid catalytic component comprising:
a $MgCl_2$-xROH support, where x is in the range from about 1 to about 10 and wherein ROH is an alcohol or a mixture of at least two different alcohols;
a group 4$ transition metal; and
a diether internal electron donor;
wherein the molar ratio of diether internal electron donor to Mg in each catalytic component is such that the first solid catalytic component and the second solid catalytic component individually produce propylene homopolymers having xylene solubles (XS) values that differ from each other by 1 wt % or greater.

14. The catalyst system of claim 13, wherein the first solid catalytic component and the second solid catalytic component individually produce propylene homopolymers having xylene solubles (XS) values that differ from each other by 2 wt % or greater.

15. The catalyst system of claim 13, wherein the first solid catalytic component produces a propylene homopolymer having a XS value in the range from about 3 wt % to about 20 wt %, and wherein the second solid catalytic component produces a propylene homopolymer having a XS value in the range from about 0.1 wt % to about 2 wt %.

16. The catalyst system of claim 13, wherein the first solid catalytic component produces a propylene homopolymer having a XS value in the range from about 4 wt % to about 10 wt %.

17. The catalyst system of claim 13, wherein the second solid catalytic component produces a propylene homopolymer having a XS value in the range from about 0.5 wt % to about 1.5 wt %.

* * * * *